United States Patent [19]

Knapp et al.

[11] Patent Number: 4,472,965

[45] Date of Patent: Sep. 25, 1984

[54] METHOD FOR PREVENTING DAMAGE TO A TEMPERATURE-DEPENDENT RESISTOR DISPOSED IN A FLOW CROSS-SECTION CAUSED BY OVERHEATING AND AIR FLOW RATE MEASURING DEVICE FOR PERFORMING THE METHOD

[75] Inventors: Heinrich Knapp, Leonberg; Peter Romann, Stuttgart; Franz-Josef Thiel, Ludwigsburg, all of Fed. Rep. of Germany

[73] Assignee: Robert Bosch GmbH, Stuttgart, Fed. Rep. of Germany

[21] Appl. No.: 420,778

[22] Filed: Sep. 21, 1982

[30] Foreign Application Priority Data

Feb. 3, 1982 [DE] Fed. Rep. of Germany ....... 3203641

[51] Int. Cl.³ .............................................. G01F 1/68
[52] U.S. Cl. ..................................... 73/118.2; 73/204
[58] Field of Search .............. 73/118 A, 204; 123/494

[56] References Cited

U.S. PATENT DOCUMENTS 3,835,820  9/1974  Fujisawa ......................... 123/494 X
4,373,383  2/1983  Plapp ................................ 73/118 A Primary Examiner—Gerald Goldberg
Assistant Examiner—E. G. Harding
Attorney, Agent, or Firm—Edwin E. Greigg

[57] ABSTRACT

A method for preventing damage to a temperature-dependent resistor disposed in a flow cross-section caused by overheating as a result of the ignition of a combustible, gaseous mixture during a burnoff process and an air flow rate measuring device for performing the method are proposed. The air flow rate measuring device includes a temperature-dependent resistor disposed in a bypass line. Deposits on the surface of the temperature-dependent resistor are removed in a burnoff process, preferably following the opening of the ignition switch. The danger then exists that if the device is used in a motor vehicle, combustible fuel-air mixture located in the vicinity of the temperature-dependent resistor may ignite, and the temperature-dependent resistor would thereby be destroyed because of overheating. For this reason, a slide member is pushed into the flow cross-section during the burnoff process, so that only a small combustible volume is available in the vicinity of the temperature-dependent resistor.

12 Claims, 4 Drawing Figures

METHOD FOR PREVENTING DAMAGE TO A TEMPERATURE-DEPENDENT RESISTOR DISPOSED IN A FLOW CROSS-SECTION CAUSED BY OVERHEATING AND AIR FLOW RATE MEASURING DEVICE FOR PERFORMING THE METHOD

BACKGROUND OF THE INVENTION

The invention is based on an air flow rate measuring device as generally defined hereinafter. An air flow rate measuring device is already known (German Offenlegungsschrift 27 50 050 and corresponding U.S. Pat. No. 4,196,622), in which deposits occur on the surface of the temperature-dependent resistor embodied as a hot wire when the resistor is used for measuring the mass of air aspirated by an internal combustion engine; these deposits disadvantageously affect the precision of measurement and the speed of measurement. In this known air flow rate measuring device, a burnoff procedure is provided at specific times, for example, immediately following the shutoff of the ignition, during which process the deposits are burned off from the temperature-dependent resistor by means of an elevation in temperature of the resistor caused by a higher electrical current supplied to the resistor. However, it is unavoidable that a rich fuel-air mixture in the intake manifold will at some time be located in the vicinity of the temperature-dependent resistor and will ignite during the burnoff process at the red-hot temperature-dependent resistor. This unavoidable condition causes an undesirable further increase in temperature at the temperature-dependent resistor, which may cause the destruction of the resistor itself, particularly under the catalytic influence of a temperature-dependent resistor fabricated of platinum wire. The danger also exists that the combustion processes at the temperature-dependent resistor may last after the burnoff current through the resistor has been shut off, and a fresh fuel-air mixture may then be drawn into this combustion area surrounding the temperature-dependent resistor by a flue effect. Not only is there a danger that the temperature-dependent resistor may be destroyed as a consequence of such uncontrollable combustion, but there is also the danger that other parts of the engine will catch fire.

OBJECT AND SUMMARY OF THE INVENTION

The method and the air flow rate measuring device according to the invention have the advantage over the prior art in that only a very small quantity of combustible mixture is located in the vicinity of the temperature-dependent resistor during the actual burnoff process of the resistor, and a combustible mixture is prevented from flowing in toward the temperature-dependent resistor so that destruction of the resistor caused by overheating and the danger of fire are therefore precluded.

Further advantageous developments of and improvements to the method and the air flow rate measuring device according to the the invention are contemplated. In particular, it is advantageous to block the flow cross-section upstream and downstream of the temperature-dependent resistor by means of a slide member during the burnoff process.

The invention will be better understood and further objects and advantages thereof will become more apparent from the ensuing detailed description of two preferred embodiments taken in conjunction with the drawings.

DESCRIPTION OF THE PREFERRED EMBODIMENTS

Figure 1:
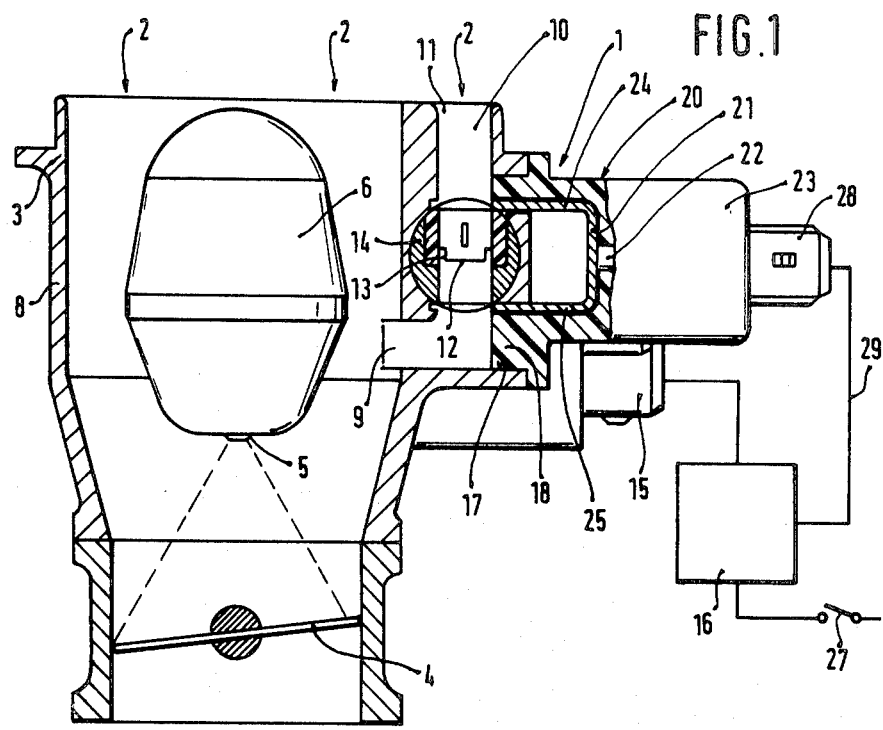
FIG. 1 shows a first exemplary embodiment of an air flow rate measuring device according to the invention at the intake manifold of an internal combustion engine.

The first exemplary embodiment of an air flow rate measuring device 1 shown in FIG. 1 is used, by way of example, in an internal combustion engine having a fuel injection system. The air for combustion aspirated by the engine flows in the direction of the arrow 2 through an air filter (not shown) into an air intake fitting 3, in which a throttle device embodied as a throttle valve 4 is disposed, as a result of which the air intake fitting, forming a flow conduit for the aspirated air, is opened to a greater or lesser extent. Upstream of the throttle valve 4 there is a fuel injection valve 5, which is actuated electromagnetically by way of example and is disposed concentrically such that the ejected fuel reaches the opening gap formed at the throttle valve 4 in a conical pattern. By means of the outer lining 6 of the fuel injection valve 5, a restricted section 8 is formed in the air intake fitting 3, at the narrowest point of which the mouth 9 of a bypass line 10 around the restricted section 8 is advantageously disposed. The beginning 11 of the bypass line 10 is advantageously located on the air intake fitting 3 downstream of the air filter. In order to ascertain the mass of air aspirated by the engine, the air flow rate measuring device 1 has a temperature-dependent resistor 12, which is embodied as a hot wire or hot band. The hot wire 12 is supported via holder elements 13 such that it is thermally and electrically insulated within an insertion body 14. The hot wire is stretched out at least partially transversely within the flow cross-section formed by the bypass line 10. The measurement signal of the hot wire 12 is evaluated by an electronic regulating circuit 16 via a plug 15; the regulating circuit 16 likewise regulates the hot wire 12 to a constant temperature. Deposits on the hot wire cause an impairment of the measurement value and retard the speed of measurement. It is thus provided in a known manner that the hot wire 12 be triggered by the electronic regulating circuit 16 at specific times, for instance when the ignition is shut off, in such a manner that it experiences the flow through it of a higher electric current and heats to a temperature of approximately 1,000° C. so that the deposits burn off from the surface of the hot wire 12. However, the danger exists that rich fuel-air mixture may reach the vicinity of the hot wire 12 and ignite on the glowing hot wire 12, resulting in an undesirable further temperature increase of the hot wire, which under such unfavorable conditions may cause its destruction. Even if the burnoff current flowing through the hot wire 12 is shut off, the catalytic influence of the hot wire 12 made of platinum may cause the combustion of the fuel-air mixture in the vicinity of the hot wire 12 to continue, and a new fuel-air mixture may be aspirated via the mouth 9 of the bypass line 10 as a consequence of a flue effect. An uncontrolled combustion process of this kind is not only undesirable because of the danger of a fire, but also because of the danger of destruction of the hot wire 12.

In accordance with the invention, a protective device 20 is therefore inserted into a guide opening 17 of the air intake manifold, having an extension 18 which has a U-shaped slide member 21, which is axially displaceable via an actuation rod 22 by an electromagnet 23 (not otherwise shown). In the exemplary embodiment shown in FIG. 1, when the electromagnet 23 is not excited, the slide member 21 is held in the illustrated position by a restoring spring (not shown). In this position, the arms 24 and 25 of the slide member 21 are located outside the flow cross-section of the bypass line 10, so that a free flow through the bypass line 10 can occur.

Figure 2:
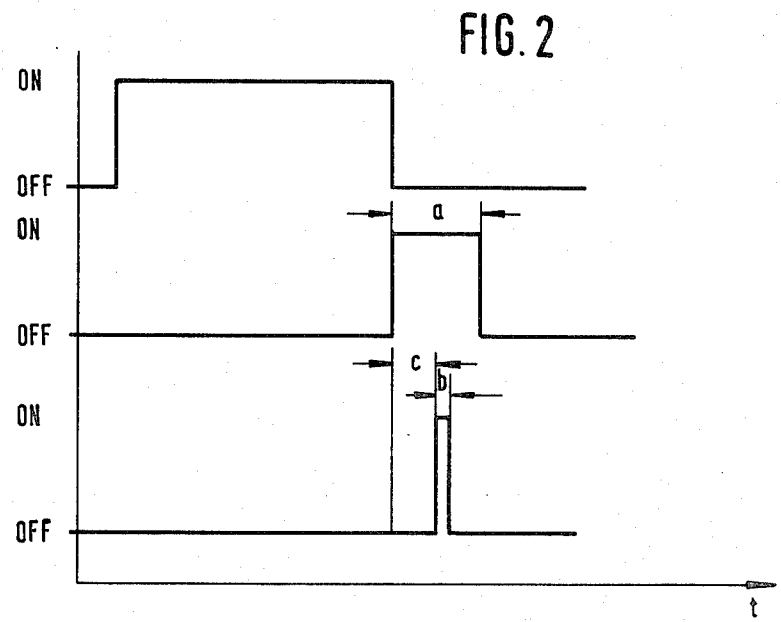
FIG. 2 is a diagram showing the relationship over time between a burnoff process and the control of the slide member in an air flow rate measuring device according to FIG. 1.

The function of the air flow rate measuring device 1 having the protective device 20 can be explained as follows, referring to the diagram of FIG. 2:

Upon the closure of an ignition switch 27 of the engine, the electronic regulating circuit 16 is supplied with current from the battery of the engine (not shown), and the engine is started via a starter motor. The running engine aspirates air via the air intake fitting 3, the mass of which is measured by means of the hot wire 12 and evaluated via the electronic regulating circuit 16. In the diagram of FIG. 2, t indicates the time at which the individual method steps occur. If the ignition switch 27 is opened, that is, if the engine is stopped, then this is a favorable time at which the hot wire 12 can have deposits burned off it. With the opening of the ignition switch 27, the electromagnet 23 of the protective device 20, which acts as an electromagnetic servomotor, is triggered via a plug 28 by means of the electronic regulating circuit 16 in a manner that is limited in terms of time and such that the electromagnet 23 pushes the slide member 21 into the bypass line 10, counter to the force of the restoring spring, such that the arm 24 upstream of the hot wire 12 and the arm 25 downstream of the hot wire 12 block the bypass line 10. It is advantageous if this blocking by the arms 24 and 25 is effected quite close to the hot wire 12 so that the smallest possible volume around the hot wire 12 will be encapsulated by the slide member 21. The electromagnet 23, excited via a trigger line 29 for a period "a" by means of the electronic regulating circuit 16, can be kept small in its structural volume because the triggering each time is short, for example, 10 seconds long, and may also be provided with a coil designed for very low ohms. After the elapse of the period "a", the triggering of the electromagnet 23 by the electronic regulating circuit is interrupted, and the restoring spring (not shown) pushes the slide member 21 out of the bypass line 10, so that a free flow can again take place via the bypass line the next time the engine is started. The burnoff process which also occurs following the opening of the ignition switch 27 lasts, as indicated by the symbol "b", for approximately 1 second and should take place within the period of time marked by the symbol "a" in which the slide member 21 encapsulates the hot wire 12. In order to be sure that the hot wire 12 will in fact be fully encapsulated during the burnoff procedure, it may be advantageous for the burnoff procedure to occur only after a delay of a duration "c", amounting to approximately 5 seconds, following the opening of the ignition switch 27. By encapsulating the hot wire 12 during the burnoff process, a very small quantity of combustible mixture is the most that can be located in the immediate vicinity of the hot wire 12, and a further inflow of combustible mixture to the hot wire is prevented.

Figure 3:
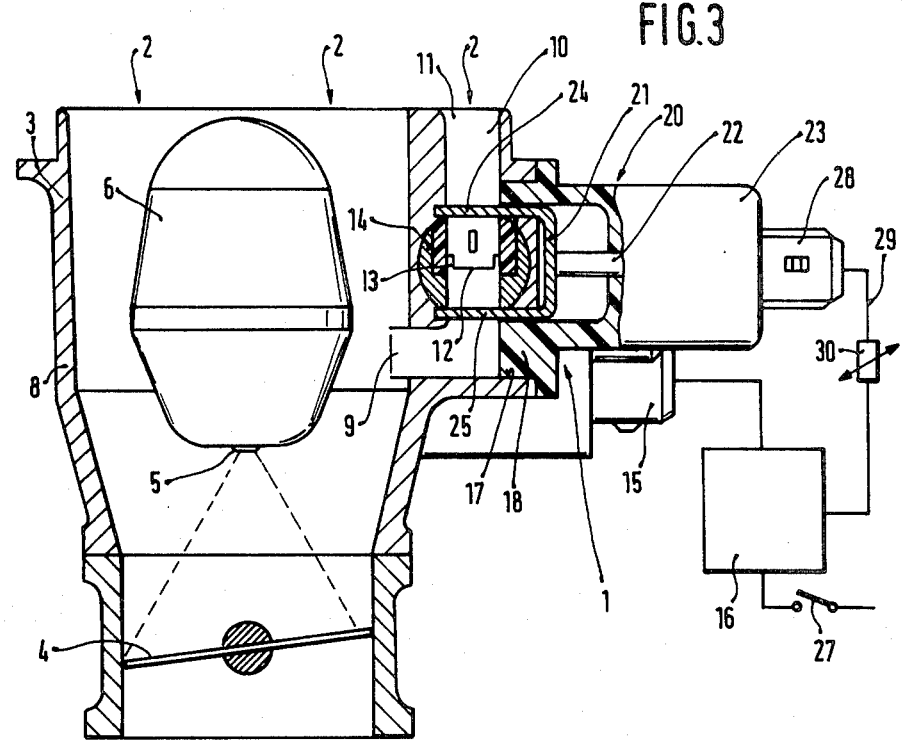
FIG. 3 shows a second exemplary embodiment of an air flow rate measuring device according to the invention.

In the second exemplary embodiment shown in FIG. 3, the restoring spring (not shown) of the protective device 20 is disposed such that in the non-excited state of the electromagnet 23 it displaces the slide member 21 with its arms 24 and 25 into the bypass line 10, so that the hot wire 12 is encapsulated. Elements of the two exemplary embodiments shown in FIGS. 1 and 3 which have the same function are identified by the same reference numerals.

Figure 4:
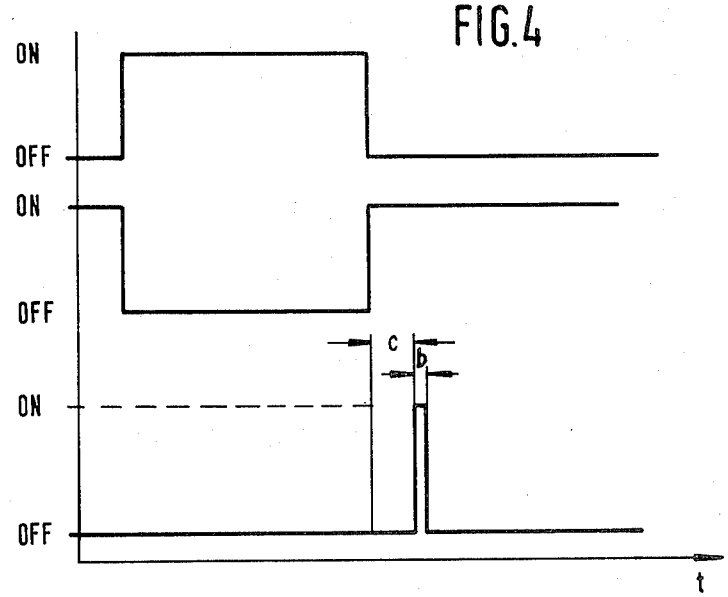
FIG. 4 is a diagram showing the relationship over time between a burnoff process and the control of the slide member in an air flow rate measuring device according to FIG. 3.

The function of the protective device 20 according to the second exemplary embodiment shown in FIG. 3 will now be explained, referring to the diagram given in FIG. 4.

With the closure of the ignition switch, an excitation of the electromagnet 23 takes place via a PTC (positive temperature coefficient) resistor 30 of known design in the trigger line 29; the electromagnet 23 thus draws the slide member 21 out of the bypass line 10, counter to the force of the restoring spring. With the closure of the ignition switch 27, a high current (attracting current) at first flows via the low-ohm PTC resistor 30, which after a short time is regulated downward to a low value (holding current) by means of the warming up of the PTC resistor 30; this low holding current, however, suffices to hold the slide member 21 outside the bypass line 10. If the ignition switch 27 is then opened, then the supply of current to the electromagnet 23 is thus interrupted, and the restoring spring displaces the slide member 21 into the bypass line 10, as a result of which the hot wire 12 is encapsulated. The burnoff process "b" of the hot wire 12 is then initiated with a delay period "c" by means of the electronic regulating circuit 16.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A method for preventing damage to a temperature-dependent resistor during a burnoff process for burning off deposits from the surface of the temperature-dependent resistor disposed in a flow cross-section of an air flow rate measuring device serving to measure the air aspirated by an internal combustion engine, comprising the step of, encapsulating the temperature-dependent resistor in the flow cross-section in order to preclude a flow.

2. A method as defined by claim 1, wherein the flow cross-section is blocked during the burnoff process upstream and downstream in the vicinity of the temperature-dependent resistor.

3. A method as defined by claim 1 or 2, comprising the further step of, triggering the burnoff process of the temperature-dependent resistor upon the interruption of the ignition of the engine.

4. A method as defined by claim 3, further comprising the step of, opening the flow cross-section when the ignition of the internal combustion engine is switched "ON".

5. An air flow rate measuring device having an electronic regulating circuit and a temperature-dependent resistor disposed in a flow cross-section for ascertaining the mass of the flowing air, wherein a burnoff process is triggered at the temperature-dependent resistor at specific times in order to burn off deposits from the surface of the temperature-dependent resistor, comprising, at least one slide member (21, 24, 25) for blocking the flow cross-section near the temperature-dependent resistor (12).

6. An airflow rate measuring device as defined by claim 5, wherein the one slide member (21) comprises a U-shaped element, one arm (24) of which blocks the flow cross-section (10) upstream of the temperature-dependent resistor (12) and the other arm (25) of which blocks the flow cross-section (10) downstream of the temperature-dependent resistor (12).

7. An air flow rate measuring device as defined by claim 5, wherein the one slide member (21) is actuatable by means of an electromagnetic servomotor (23).

8. An air flow rate measuring device as defined by claim 7, wherein the one slide member (21), in the non-excited state of the electromagnetic servomotor (23), opens the flow cross-section.

9. An air flow rate measuring device as defined by claim 7, wherein the electromagnetic servomotor (23) is excitable in a manner limited in terms of time (a) in response to a means (27) for switching the ignition of the engine, and further comprising, means (16) responsive to the switching means for triggering the burnoff process (b) of the temperature-dependent resistor (12) whereby the electromagnetic servomotor moves the slide member (21) in the direction toward a blocking of the flow cross-section (10).

10. An air flow rate measuring device as defined by claim 7, wherein the slide member (21), in the non-excited state of the electromagnetic servomotor (23), blocks the flow cross-section (10).

11. An air flow rate measuring device as defined by claim 9, wherein the electromagnetic servomotor (23) is excitable upon the switching "ON" of the ignition switching means (27) of the engine, whereby the slide member (21) is moved in the direction for opening of the flow cross-section (10).

12. An air flow rate measuring device as defined by claim 11, wherein the triggering means (16) comprises A PTC resistor (30) disposed in a trigger line (29) of the electromagnetic servomotor (23) for reducing the current to the excited electromagnetic servomotor (23).

* * * * *